(12) United States Patent
Meggiolan et al.

(10) Patent No.: US 11,865,861 B2
(45) Date of Patent: Jan. 9, 2024

(54) SPOKE ATTACHMENT ASSEMBLY FOR A SPOKED BICYCLE WHEEL, RELATED WHEEL AND PROCESS FOR MANUFACTURING SUCH A WHEEL

(71) Applicant: CAMPAGNOLO S.r.l., Vicenza (IT)

(72) Inventors: Mario Meggiolan, Creazzo (IT); Filippo Bove, Padua (IT)

(73) Assignee: CAMPAGNOLO S.r.l., Vicenza (IT)

( * ) Notice: Subject to any disclaimer, the term of this patent is extended or adjusted under 35 U.S.C. 154(b) by 158 days.

(21) Appl. No.: 17/380,571

(22) Filed: Jul. 20, 2021

(65) Prior Publication Data
US 2022/0032680 A1    Feb. 3, 2022

(30) Foreign Application Priority Data
Jul. 28, 2020   (IT) .......................... 102020000018217

(51) Int. Cl.
*B60B 1/04*        (2006.01)
*B60B 21/06*       (2006.01)

(52) U.S. Cl.
CPC .............. *B60B 1/041* (2013.01); *B60B 1/045* (2013.01); *B60B 21/062* (2013.01); *Y10T 29/49512* (2015.01)

(58) Field of Classification Search
CPC ......... B60B 1/041; B60B 1/043; B60B 1/044; B60B 1/045; B60B 21/062; B60B 31/005; Y10T 29/49512
See application file for complete search history.

(56) References Cited

U.S. PATENT DOCUMENTS

| 546,320 | A | * | 9/1895 | Goodrich .............. B60B 21/062 |
|---|---|---|---|---|
| | | | | 301/58 |
| 4,410,842 | A | | 10/1983 | Owen |
| 8,025,344 | B1 | | 9/2011 | Wang |
| 2004/0100142 | A1 | | 5/2004 | Meggiolan et al. |
| 2004/0139609 | A1 | | 7/2004 | Meggiolan et al. |

(Continued)

FOREIGN PATENT DOCUMENTS

| CH | 355 041 A | 6/1961 |
|---|---|---|
| CN | 101332742 A | 12/2008 |

(Continued)

OTHER PUBLICATIONS

Italian Search Report and Written Opinion in Italian Application No. 102020000018217, dated Apr. 15, 2021 with English translation.

(Continued)

*Primary Examiner* — Kip T Kotter
(74) *Attorney, Agent, or Firm* — Steinfl + Bruno LLP

(57) ABSTRACT

A spoke attachment assembly configured to couple a rim to the spokes of a spoked bicycle wheel. The spoke attachment assembly comprises a nipple having an enlarged head and a stem provided with a coupling portion for coupling with a spoke, at least one shaped washer associated with the nipple and configured to abut on one side with the enlarged head of the nipple and, on the opposite side, with the rim and holding means configured to hold said at least one shaped washer associated with the nipple. The invention also relates to a spoked bicycle wheel and to a process for manufacturing such a wheel.

14 Claims, 8 Drawing Sheets

(56) References Cited

U.S. PATENT DOCUMENTS

| | | | |
|---|---|---|---|
| 2004/0165938 A1* | 8/2004 | Chen | ................ B60B 1/047 403/43 |
| 2005/0161997 A1 | 7/2005 | Passarotto et al. | |
| 2007/0158996 A1 | 7/2007 | Meggiolan et al. | |
| 2009/0014129 A1 | 1/2009 | Hsu | |
| 2012/0212038 A1 | 8/2012 | Watarai | |
| 2014/0239703 A1 | 8/2014 | Walthert et al. | |
| 2019/0168536 A1 | 6/2019 | Meggiolan | |
| 2022/0032684 A1 | 2/2022 | Meggiolan et al. | |

FOREIGN PATENT DOCUMENTS

| | | | | |
|---|---|---|---|---|
| DE | 10 2008 048453 | A1 | | 10/2009 |
| DE | 10 2009 052027 | A1 | | 5/2011 |
| DE | 102016005990 | A1 | * | 11/2017 |
| EP | 138756 | A2 | * | 2/2004 |
| EP | 1 422 078 | A1 | | 5/2004 |
| EP | 1 559 582 | A1 | | 8/2005 |
| EP | 2 492 113 | A1 | | 8/2012 |
| EP | 2487047 | A1 | * | 8/2012 ........... B60B 21/025 |
| EP | 2 769 851 | A1 | | 8/2014 |
| EP | 3 495 161 | A1 | | 6/2019 |
| EP | 3495161 | A1 | | 6/2019 |
| FR | 2513185 | A1 | * | 3/2002 |
| FR | 2813558 | A1 | * | 3/2002 ............. B60B 1/041 |
| JP | S57 91603 | U | | 6/1982 |

OTHER PUBLICATIONS

Italian Search Report and Written Opinion in Italian Application No. 102020000018223, dated Apr. 15, 2021 with English translation.

Non-Final Office Action for U.S. Appl. No. 17/380,594, fiked Jul. 20, 2021 on behalf of Campagnolo S.R.L. dated Apr. 4, 2023 16 pages.

Final Office Action for U.S. Appl. No. 17/380,594, filed Jul. 20, 2021 on behalf of Campagnolo S.R.L. dated Jul. 17, 2023 13 pages.

Notice of Allowance for U.S. Appl. No. 17/380,594, filed Jul. 20, 2021 on behalf of Campagnolo S.R.L. dated Oct. 17, 2023 5 pages.

* cited by examiner

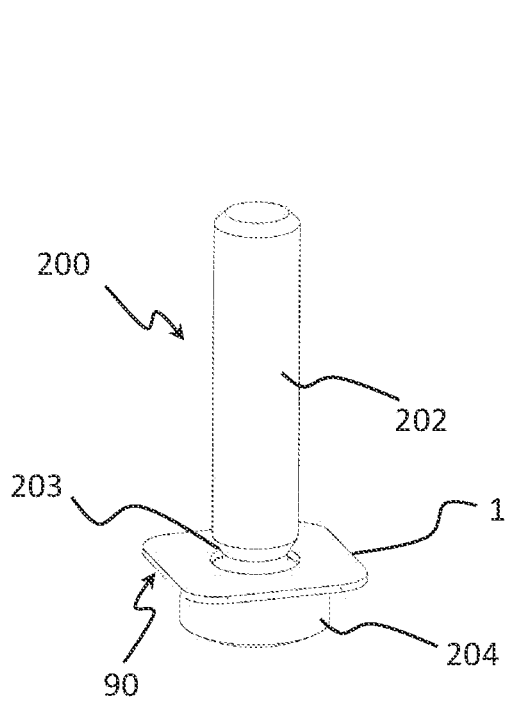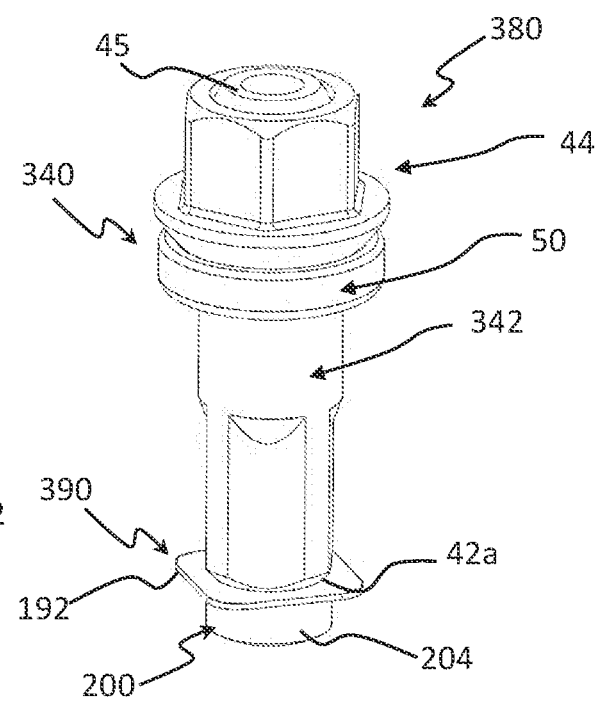
FIG. 6
FIG. 7
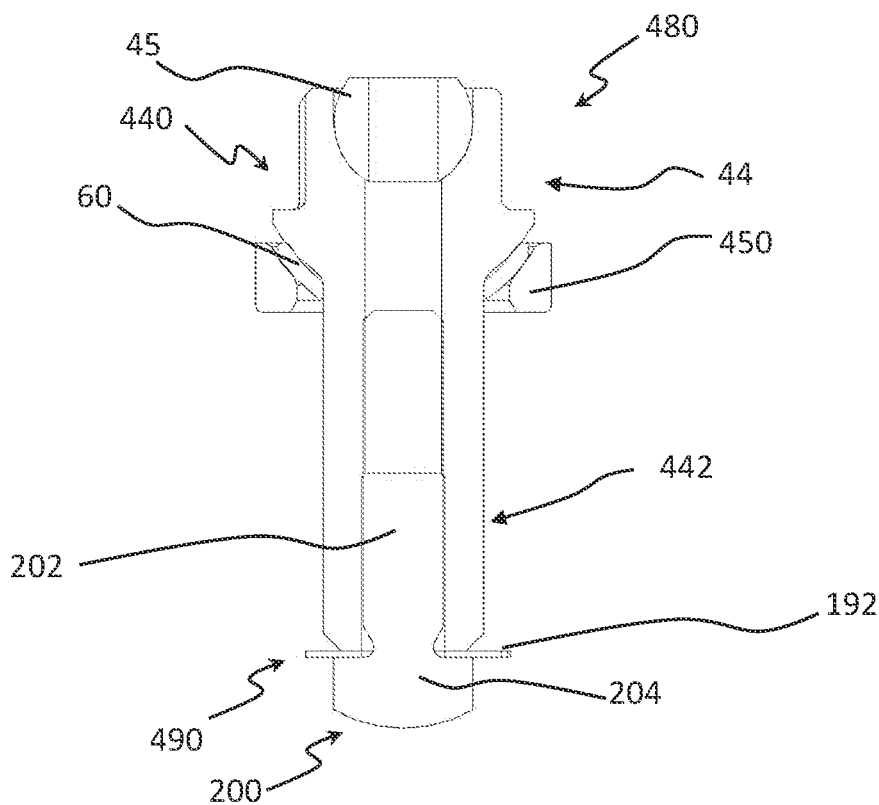
FIG. 8

SPOKE ATTACHMENT ASSEMBLY FOR A SPOKED BICYCLE WHEEL, RELATED WHEEL AND PROCESS FOR MANUFACTURING SUCH A WHEEL

CROSS REFERENCE TO RELATED APPLICATION

This application claims the benefit of Italian Application No. 102020000018217, filed on Jul. 28, 2020, which is incorporated herein by reference as if fully set forth.

FIELD OF INVENTION

The present invention relates to a spoke attachment assembly configured to be coupled to a rim of a spoked bicycle wheel, as well as to a spoked bicycle wheel in which such an assembly is used. The aforementioned wheel can be a front wheel or a rear wheel of the bicycle. Such a bicycle can be a mountain-bike or a leisure bicycle or a racing bicycle.

A spoked bicycle wheel comprises a rim, a hub and a plurality of spokes extending between the hub and the rim.

The present invention also relates to a process for manufacturing such a wheel.

BACKGROUND

It is known coupling the rim to a plurality of nipples, one for each spoke, and coupling each spoke to the rim through a respective nipple.

The nipple can be configured to allow the adjustment of the tension of the spoke at the rim. Differently, the nipple can simply allow the coupling of the spoke to the rim. In this case, the adjustment of the tension of the spoke can take place at the hub.

The nipple comprises an enlarged head configured to abut with the rim upon tensioning the spoke and a stem provided with a coupling portion configured to be coupled to the spoke.

In the cases in which the nipple is configured to allow the adjustment of the tension of the spoke, the coupling portion comprises a threaded hole which opens at a free end of the stem.

The spoke comprises an end portion configured to be coupled to the hub in a conventional manner and an opposite end portion configured to be coupled to the rim.

In the cases in which the nipple is configured to allow the adjustment of the tension of the spoke, the aforementioned opposite end portion of the spoke has an outer threading configured to be screwed to the threaded hole of the respective nipple. The length of the aforementioned outer threading can be equal to that of the threaded hole of the nipple, but typically it is greater than that of the threaded hole of the nipple, so that tensioning of the spoke may be adjusted by screwing or unscrewing the spoke into or from the nipple. Such screwing/unscrewing is obtained by rotating the nipple. Due to such a screwing/unscrewing the screwing depth of the spoke in the threaded hole of the nipple changes and, consequently, the total longitudinal extension of the assembly formed by spoke and nipple increases or decreases.

Rims having a radially outer tyre coupling channel and a radially inner spoke attachment chamber are known. Such a type of rim is shown for example in US 2007/0158996 A1, to the same Applicant.

Typically, the rims are made of aluminium or alloys thereof (in which case they can be obtained by extrusion of a profiled bar) or of a composite material (in which case they can be obtained by injection or compression molding).

The spoke attachment chamber comprises a lower bridge in which a plurality of spoke-attachment through holes are made, each configured to house a respective nipple, and in which a through hole is also made for the passage of the inflation valve of the air chamber of the tyre of the wheel or, in the case of tubeless tyres, of the tyre itself.

The spoke attachment chamber further comprises an upper bridge in which a through hole for the passage of the aforementioned inflation valve is made. In many solutions, further through holes are formed on the upper bridge, one at each spoke-attachment through hole, in order to allow the insertion of the nipples in the respective spoke-attachment through holes.

The stem of each nipple is inserted into the respective spoke-attachment through hole from a radially outer side with respect to the lower bridge of the rim, whereas the enlarged head of the nipple remains in a radially outer position with respect to the lower bridge and, after the spoke has been coupled to the nipple (typically screwed onto the threaded hole of the nipple) and tensioned, in abutment on the lower bridge.

In the case of rims made of aluminium (or alloys thereof), the enlarged head of the nipple is typically in abutment on a suitable abutment seat made in a recess formed, typically by mechanical chip removal, in the lower bridge of the rim at least at each spoke-attachment through hole.

In the case of rims made of a composite material, since it is not easy to make the aforementioned recess due to the difficulty in machining the composite material, the enlarged head of the nipple is typically in abutment on a perforated insert specifically arranged on the lower bridge of the rim at each of the spoke-attachment through holes. The perforated inserts are typically co-molded with the rim, as described for example in EP 3495161 A1, to the same Applicant, and can for example be made of polyetherimide, commercialized with the trade name Ultem 2400 by Sabic, Riyadh.

A drawback of this last solution is the cost of the perforated inserts, due to the particular material used.

Again in the case of rims made of a composite material, in order to make a more cost-effective solution, it is known to use, instead of the aforementioned perforated inserts, a plurality of shaped washers made of steel, each shaped washer being arranged at each spoke-attachment through hole. In this case, the lower bridge has a substantially flat circumferential surface on which the aforementioned shaped washers rest. The upper bridge, on the other hand, has a plurality of service holes, one at each spoke-attachment through hole, in order to allow the insertion of the shaped washers and of the respective nipples in the spoke attachment chamber and their positioning at the respective spoke-attachment through holes, through for example suitable elongated tools.

A drawback of this solution is correlated to the need to apply a band onto the upper bridge to seal the aforementioned service holes, so as both not to risk damaging or perforating the air chamber of the tyre and to allow the airtight seal in the case of use of rims configured to be used with tubeless tyres.

A solution that overcomes the problem of providing a plurality of service holes on the upper bridge of the rim is described in US 2007/0158996 A1, to the same Applicant. Such a document discloses a rim in which the upper bridge has only one through hole for the inflation valve of the tyre, or a limited number of service holes. In such a document a process is also described that is aimed at manufacturing a spoked bicycle wheel. Such a process comprises the step of inserting the nipple into the spoke attachment chamber through an opening (which can be the through hole for the tyre inflation valve or a different opening made on purpose) and guiding the nipple along the spoke attachment chamber towards and up to a respective spoke attachment seat. The process further comprises the step of inserting the stem of the nipple into the spoke attachment seat until the head of the nipple is brought in abutment on the lower bridge of the rim.

The nipples described in US 2007/0158996 A1 are made of aluminium and, during the aforementioned process, are coupled to respective inserts made of a ferromagnetic material. Each ferromagnetic insert has a head and a threaded stem that is screwed into a threaded hole of the nipple. In this way, the assembly of nipple and ferromagnetic insert, once inserted into the spoke attachment chamber, is guided and moved along the spoke attachment chamber due to the magnetic attraction exerted for example by a small magnet that is moved by hand or automatically, along and outside of the rim, until the predetermined spoke attachment seat is reached. Once such a spoke attachment seat is reached, the stem of the nipple is extracted from the spoke attachment seat thanks to the magnetic coupling between one end of the magnet and the head of the ferromagnetic insert. Thereafter, the magnet is detached from the ferromagnetic insert, the latter is unscrewed from the threaded hole of the nipple and a threaded end portion of the spoke is screwed onto the nipple.

The aforementioned process can be used for rims made of steel, aluminium (or alloys thereof), magnesium (or alloys thereof) or of a composite material.

The Applicant has concentrated its attention on rims of the type described in US 2007/0158996 A1, or on rims that do not require making on the upper bridge a service hole at each spoke attachment seat and consequently applying on the upper bridge a band in order to allow the use of the rim with tubeless tyres or in order to avoid damaging the air chamber of the tyre.

The Applicant has observed that the process described in US 2007/0158996 A1 cannot be applied as such in those cases in which, in order to maintain the cost-effectiveness of the rim, the shaped washers discussed above are used. Indeed, there would be the risk that such shaped washers, once inserted in the spoke attachment chamber, can be dispersed inside such a chamber or, in the case in which they are inserted already applied onto the stem of the nipple, can slip off from the nipple, with consequent complications in the assembly and/or manufacturing operations of the wheel.

The technical problem at the basis of the present invention is to provide a system that allows an easy positioning of the nipples and of the respective shaped washers at the spoke attachment seats of the lower bridge of the rim in those cases in which the upper bridge of the rim does not have a service hole at each spoke attachment seat.

SUMMARY

The present invention therefore relates, in a first aspect thereof, to a spoke attachment assembly configured to be coupled to a rim of a spoked bicycle wheel, comprising:

a nipple having an enlarged head and a stem provided with a coupling portion configured to be coupled to a spoke;

at least one shaped washer associated with the nipple and configured to abut on one side with the enlarged head of the nipple and, on the opposite side, with the rim;

characterized in that it comprises holding means configured to hold said at least one shaped washer associated with the nipple.

Throughout the present description and in the following claims, when the term "associated" is used with reference to the coupling between the at least one shaped washer and the nipple it is intended to indicate both a direct coupling between the at least one shaped washer and the nipple, like for example when the at least one shaped washer is applied onto the stem of the nipple, and an indirect coupling between the at least one shaped washer and the nipple, like for example when the at least one shaped washer is directly coupled to a further component that is in turn directly coupled to the nipple. This distinction between direct and indirect coupling will become clear in the detailed description, in particular when the different embodiments of the spoke attachment assembly according to the present invention will be discussed.

Thanks to the provision of the aforementioned holding means, the at least one shaped washer can be associated with the nipple before the spoke is coupled to the nipple, and in particular before the nipple and the at least one shaped washer are inserted in the rim, the at least one shaped washer remaining associated with the nipple until the nipple is arranged at the respective spoke attachment seat. In this way, the assembly and/or manufacturing operations of the wheel are extremely simplified. In practice, the at least one shaped washer is arranged at the spoke attachment seat at the same time as the nipple.

In a second aspect thereof, the invention relates to a spoked bicycle wheel, comprising:

a rim comprising a tyre coupling channel and at least one spoke attachment chamber, the at least one spoke attachment chamber being provided with at least one opening and with a spoke attachment surface comprising a plurality of spoke attachment seats, said at least one opening comprising a number of openings smaller than the number of spoke attachment seats;

a plurality of nipples each having an enlarged head arranged in said at least one spoke attachment chamber and a stem inserted in a respective spoke attachment seat and provided with a coupling portion configured to be coupled to a respective spoke;

a plurality of spokes each having an end portion coupled to the coupling portion of the stem of a respective nipple;

characterized in that it comprises, for each of said nipples, at least one shaped washer applied onto the stem of the nipple and in abutment on one side with the enlarged head of the nipple and, on the opposite side, with the spoke attachment surface.

Such a wheel can be easily assembled thanks to the fact that the at least one shaped washer can be associated with the nipple before coupling the spoke to the nipple, as already stated above. The provision of a limited number of openings, such a number in particular being smaller than the number of spoke attachment seats and possibly even equal to one, makes it possible not to require the application of a band on the rim in order to assemble and/or manufacture wheels with tubeless tyres or in order to avoid damaging the air chamber of the tyre.

In a third aspect thereof, the invention relates to a process aimed at manufacturing a spoked bicycle wheel, comprising the steps of:

a) providing a rim element having a tyre coupling channel and at least one spoke attachment chamber, the at least one spoke attachment chamber being provided with at least one opening and with a spoke attachment surface comprising a plurality of spoke attachment seats;
b) inserting a spoke attachment assembly in the at least one spoke attachment chamber through said at least one opening, said spoke attachment assembly comprising:
a nipple having an enlarged head and a stem provided with a coupling portion configured to be coupled to a respective spoke;
at least one shaped washer;
holding means configured to hold said at least one shaped washer associated with the nipple;
c) moving said spoke attachment assembly along said spoke attachment surface towards and up to one of said spoke attachment seats;
d) inserting the stem of the nipple of said spoke attachment assembly in said spoke attachment seat;
e) constraining said spoke attachment assembly to said spoke attachment seat;
f) repeating steps b) to e) in order to couple a respective spoke attachment assembly to each other spoke attachment seat.

Advantageously, through the aforementioned process the rim element can be assembled by arranging all of the spoke attachment assemblies in the respective spoke attachment seats, so as to allow the subsequent manufacture of the spoked bicycle wheel in accordance with the second aspect of the invention.

The movement of the spoke attachment assembly towards and up to the respective spoke attachment seat is obtained through the relative movement of the spoke attachment assembly with respect to the rim element. Such relative movement can be obtained by moving the spoke attachment assembly without moving the rim element, or by moving (rotating) the rim element without moving the spoke attachment assembly, or through a combination of the aforementioned two movements.

The rim element can be obtained by molding a composite material.

Alternatively, the rim element can be a profiled bar made of aluminium (or alloys thereof) or magnesium (or alloys thereof) typically obtained through an extrusion step.

In this case, the rim element can still be in the rectilinear state during the actuation of part or all of the process according to the invention, or can be already rim-shaped, still open or already closed on itself at the two ends thereof. The shaping into a circle can typically take place through a calendaring step. The joining of the ends can typically take place by welding, for example flash welding, or TIG welding, or by insertion of a sleeve and gluing, or by pin connection or other.

In at least one of the aforementioned aspects, the present invention can have the preferred features described hereinafter, both singularly or in combination, except if expressly stated otherwise.

Preferably, the holding means are removable.

In particular, the holding means are active at least until the nipple is arranged at the respective spoke attachment seat and they are removed before or after the spoke is mounted in the nipple.

In preferred embodiments, the coupling portion of the stem of the nipple comprises a threaded hole which is open at a free end of the stem. In this case, the spoke comprises, at an end portion thereof, an outer threading configured to be screwed into the threaded hole of the stem of the nipple to allow the adjustment of the tension of the spoke through rotation of the nipple.

In the assembly of the invention one or more shaped washers can be associated with each nipple with, for example two shaped washers. In this last case the shaped washers are arranged substantially concentric to one another, in order to allow a better alignment between the nipple and the spoke mounted therein, in particular in the case of a wheel with spokes that do not have a radial arrangement.

Hereinafter, for the sake of simplicity of language reference will often be made to a shaped washer associated with a nipple. What is stated nevertheless also applies to the case in which a plurality of shaped washers are associated with a nipple, except if expressly stated otherwise.

Preferably, the spoke attachment assembly comprises a portion made of a magnetically attractable material, like for example steel and/or alloys thereof.

More preferably, such a portion made of a magnetically attractable material is defined in or by the nipple, and/or in or by the at least one shaped washer, and/or in or by further elements associated with the nipple and/or with the at least one shaped washer.

In this case, preferably, the holding means are of a magnetic type.

Therefore, they are suitable for interacting with the portion of the spoke attachment assembly made of a magnetically attractable material in order to hold the shaped washer coupled to the nipple.

In preferred embodiments, the holding means comprise a maneuvering magnet configured to be handled by an operator close to the spoke attachment assembly.

For example, it is possible to hold the shaped washer applied onto the stem of the nipple and in abutment on the head of the nipple by arranging the maneuvering magnet at the head of the nipple and providing a shaped washer (or an element coupled to the shaped washer) at least in part made of a magnetically attractable material.

It is also possible to hold the shaped washer applied onto the stem of the nipple (not in abutment on the head of the nipple) by providing a maneuvering magnet having an outer dimension larger than the inner diameter of the shaped washer, arranging such a maneuvering magnet at the end of the stem of the nipple and providing that the nipple (or an element coupled to the nipple) is at least in part made of a magnetically attractable material. In this case, it is not necessary for the shaped washer to be made of a magnetically attractable material.

The maneuvering magnet can also have an outer dimension smaller than or equal to the inner diameter of the shaped washer. In this case, if the maneuvering magnet is arranged at the end of the stem of the nipple the shaped washer can move on the stem of the nipple until it reaches the maneuvering magnet and possibly goes onto the maneuvering magnet (due to the gravity in the case in which the shaped washer is not made of a magnetically attractable material or due to the magnetic attraction exerted by the maneuvering magnet in the case in which the shaped washer is made at least in part of a magnetically attractable material). Therefore, it is necessary for the nipple (or an element coupled to the nipple) to be made of a magnetically attractable material so as to keep the maneuvering magnet in contact with the nipple and, consequently, the shaped washer coupled to the nipple (through the maneuvering magnet).

Preferably, the spoke attachment assembly comprises an insert made of a magnetically attractable material, the insert being removably associated with the nipple.

Advantageously, once associated with the nipple, the insert makes the nipple attractable by the aforementioned maneuvering magnet. This is particularly useful in the assembly and/or manufacturing steps of the wheel, as will be described better hereinafter.

Preferably, the insert has a head and a rod removably housed in the stem of the nipple.

More preferably, in the embodiments in which the stem of the nipple comprises a threaded hole, the rod of the insert comprises an outer threading, in order to screw the rod of the insert into the stem of the nipple.

Advantageously, it is possible to use particularly simple inserts, similar to conventional screws.

In some embodiments, said at least one shaped washer has a predetermined inner diameter and the head of the insert has an outer dimension greater than the inner diameter of said at least one shaped washer. In this case the holding means are defined by the head of the insert, which thanks to its size prevents the shaped washer from slipping off the stem of the nipple.

In other embodiments, said at least one shaped washer is fitted onto the stem of the nipple with an interference coupling. In this case, the holding means are defined by the interference between the shaped washer and the stem of the nipple.

In some preferred embodiments, a free end portion of the rod is magnetized. In this case, the holding in position of the shaped washer on the stem of the nipple takes place thanks to the fact that, after having applied the shaped washer onto the stem of the nipple and housed the rod of the insert in the stem of the nipple, the magnetized free end portion of the rod of the insert is located close to the shaped washer and exerts a force of attraction thereon.

In other preferred embodiments, said at least one shaped washer has a predetermined inner diameter and said holding means comprise a flexible washer applied onto the rod of the insert and interposed between the free end of the stem of the nipple and the head of the insert, said flexible washer having an outer dimension greater than the inner diameter of said at least one shaped washer.

Thus, the flexible washer has dimensions such as to prevent the shaped washer from slipping off the stem of the nipple. Thanks to the flexibility thereof, during the insertion of the stem of the nipple in the respective spoke attachment seat, the flexible washer can flex to pass through the aforementioned opening.

The flexible washer can be attached to the head or to the rod of the insert through an adhesive substance, like for example a glue. In this way, it stays constrained to the insert when the latter is disassociated from the respective nipple to be reused on another nipple.

In some preferred embodiments, said at least one shaped washer has a predetermined inner diameter and said holding means comprise a holding washer mounted in a groove formed on an outer surface of the stem of the nipple on the opposite side to said at least one shaped washer with respect to the enlarged head of the nipple, wherein the holding washer has an outer dimension greater than the inner diameter of said at least one shaped washer. In this way, the shaped washer is prevented from slipping off the nipple.

Preferably, said holding washer is made of a water-soluble material, to allow its removal after the insertion of the stem of the nipple in the respective spoke attachment seat, before or after the mounting of the spoke in the nipple.

Such a water-soluble material can for example be polyvinyl alcohol.

In some preferred embodiments, the holding means comprise an adhesive substance, like for example a glue, interposed between said at least one shaped washer and the head and/or the stem of the nipple.

Preferably, said adhesive substance is water-soluble.

Such an adhesive substance can for example be a vinyl glue.

Preferably, in the spoked wheel according to the present invention there is a single opening.

More preferably, such a single opening is a through hole configured to house the inflation valve of a tyre.

Preferably, in the spoked wheel according to the present invention the rim is made of aluminium or an alloy thereof, or, more preferably, from a composite material.

Preferably, in the rim of the wheel of the present invention the spoke attachment chamber is defined between an upper bridge of the rim, which separates the tyre coupling channel from the spoke attachment chamber, and a lower bridge of the rim, which comprises the spoke attachment surface.

In this case, in the process of the present invention, the step b) of inserting the spoke attachment assembly in the at least one spoke attachment chamber is carried out until said at least one shaped washer is brought in abutment on the lower bridge and the enlarged head of said nipple is brought in abutment on said at least one shaped washer.

In the process of the present invention, the holding of the coupling between the shaped washer and the nipple can take place in various ways, depending on the type of holding means provided, as has been described earlier.

In particular, such a holding can take place by gluing said at least one shaped washer to the head and/or to the stem of the nipple.

Alternatively, or in addition to the aforementioned gluing, the aforementioned holding can take place by providing the aforementioned flexible washer and/or the aforementioned holding washer.

Alternatively, or in addition to what has been described above, the aforementioned holding can take place by providing the head of the insert with an outer dimension greater than the inner diameter of said at least one shaped washer or by magnetizing a free end portion of the rod of the insert.

Preferably, the spoke attachment assembly used in the process of the present invention comprises a portion made of a magnetically attractable material.

In this case, step b) of inserting said spoke attachment assembly in the at least one spoke attachment chamber comprises the following steps:
  coupling a maneuvering magnet to said spoke attachment assembly due to a magnetic coupling between the maneuvering magnet and the portion made of a magnetically attractable material;
  inserting the maneuvering magnet in said at least one spoke attachment chamber through said at least one opening;
  extracting the maneuvering magnet from said at least one spoke attachment chamber through a second opening substantially aligned with said at least one opening;
  decoupling the maneuvering magnet from said spoke attachment assembly.

Preferably, step c) of moving said spoke attachment assembly takes place due to a magnetic interaction between said portion made of a magnetically attractable material and a guiding magnet and comprises moving the guiding magnet along the spoke attachment surface towards and up to one of said spoke attachment seats.

Preferably, step c) of moving said spoke attachment assembly is preceded by a step of holding the spoke attachment assembly in contact with the spoke attachment surface by decoupling the maneuvering magnet from said spoke attachment assembly and simultaneously magnetically coupling said spoke attachment assembly to said guiding magnet.

Preferably, step d) of inserting the stem of the nipple in said spoke attachment seat takes place due to a magnetic coupling between said guiding magnet and said portion made of a magnetically attractable material.

Preferably, said portion made of a magnetically attractable material is defined by the aforementioned insert made of a magnetically attractable material once it is removably coupled to the nipple.

The process of the present invention can be used to constrain the spoke attachment assemblies in the respective spoke attachment seats of a rim element in the form of a profiled bar still to be shaped into a circle, or of a profiled bar already shaped into a circle or to manufacture the wheel of the present invention.

In the case in which the operation of constraining each spoke attachment assembly to the respective spoke attachment seat is not carried out simultaneously with the manufacturing of the wheel, i.e. before coupling each nipple to a respective spoke, after having removed the insert, if provided, from the nipple, an anchoring element is coupled to the portion of the stem of the nipple that projects from the spoke attachment surface on the opposite side with respect to the one in which the enlarged head of the nipple is arranged. The anchoring element has dimensions greater than those of the spoke attachment seat. Such an anchoring element is subsequently removed in the manufacturing steps of the wheel in order to associate a respective spoke with the nipple. The aforementioned anchoring element can, for example, be an elastic ring, or a clamp, arranged around the stem of the nipple or around the rod of the aforementioned insert, if provided, or a head of the aforementioned insert, having a size greater than the spoke attachment seat.

On the other hand, in the case in which the operation of constraining each spoke attachment assembly to the respective spoke attachment seat is carried out during the manufacturing of the wheel, step e) of constraining said spoke attachment assembly to said spoke attachment seat comprises coupling an end portion of a spoke to the coupling portion of the stem of the nipple inserted in said spoke attachment seat.

Preferably, after step e) of constraining said spoke attachment assembly to said spoke attachment seat and before or after the step of coupling an end portion of a spoke to the coupling portion of the stem of the nipple, the holding means are removed from the spoke attachment assembly.

Preferably, in the case in which the spoke attachment assembly comprises two shaped washers, in the wheel of the invention a first shaped washer is interposed between the enlarged head of the nipple and the spoke attachment seat and a second shaped washer is interposed between the enlarged head of the nipple and the first shaped washer.

BRIEF DESCRIPTION OF THE DRAWINGS

Further features and advantages of the invention will become clearer from the description of preferred embodiments thereof, made with reference to the attached drawings, where:

FIG. 6 is a schematic perspective view of a metallic insert and of a flexible washer applied thereon, used in the spoke attachment assembly of FIG. 7;

FIG. 7 is a schematic perspective view of a third preferred embodiment of a spoke attachment assembly according to the present invention;

FIG. 8 is a longitudinal section of a variant of the spoke attachment assembly of FIG. 7, in which two shaped washers are provided instead of one;

DETAILED DESCRIPTION OF THE PREFERRED EMBODIMENTS

Throughout the present description and in the following claims the following definitions apply.

The terms "axial", "axially" and similar terms are used to refer to a direction substantially coinciding with or substantially parallel to the rotation axis of the wheel.

The terms "radial", "radially" and similar terms are used to refer to a direction perpendicular to the rotation axis of the wheel and incident on the rotation axis of the wheel.

The terms "circumferential", "circumferentially" and similar terms are used to refer to a direction oriented along a line that extends around the rotation axis of the wheel.

The terms "axially inner" and "axially outer" and similar terms are used to refer to positions respectively closer to, and farther from, a transversal mid-plane of the wheel, whereas the terms "radially inner" and "radially outer" and similar terms are used to refer to positions respectively closer to, and farther from, the rotation axis of the wheel.

The term "longitudinal", on the other hand, is used to refer to a main direction of extension of the bicycle component considered.

The term "composite material" is used to indicate a material comprising structural fibers incorporated in a polymeric material. The structural fibers are preferably selected from the group comprising carbon fibers, glass fibers, boron fibers, aramid fibers, ceramic fibers and combinations thereof. The polymeric material can be thermoplastic or thermosetting.

Figure 1:
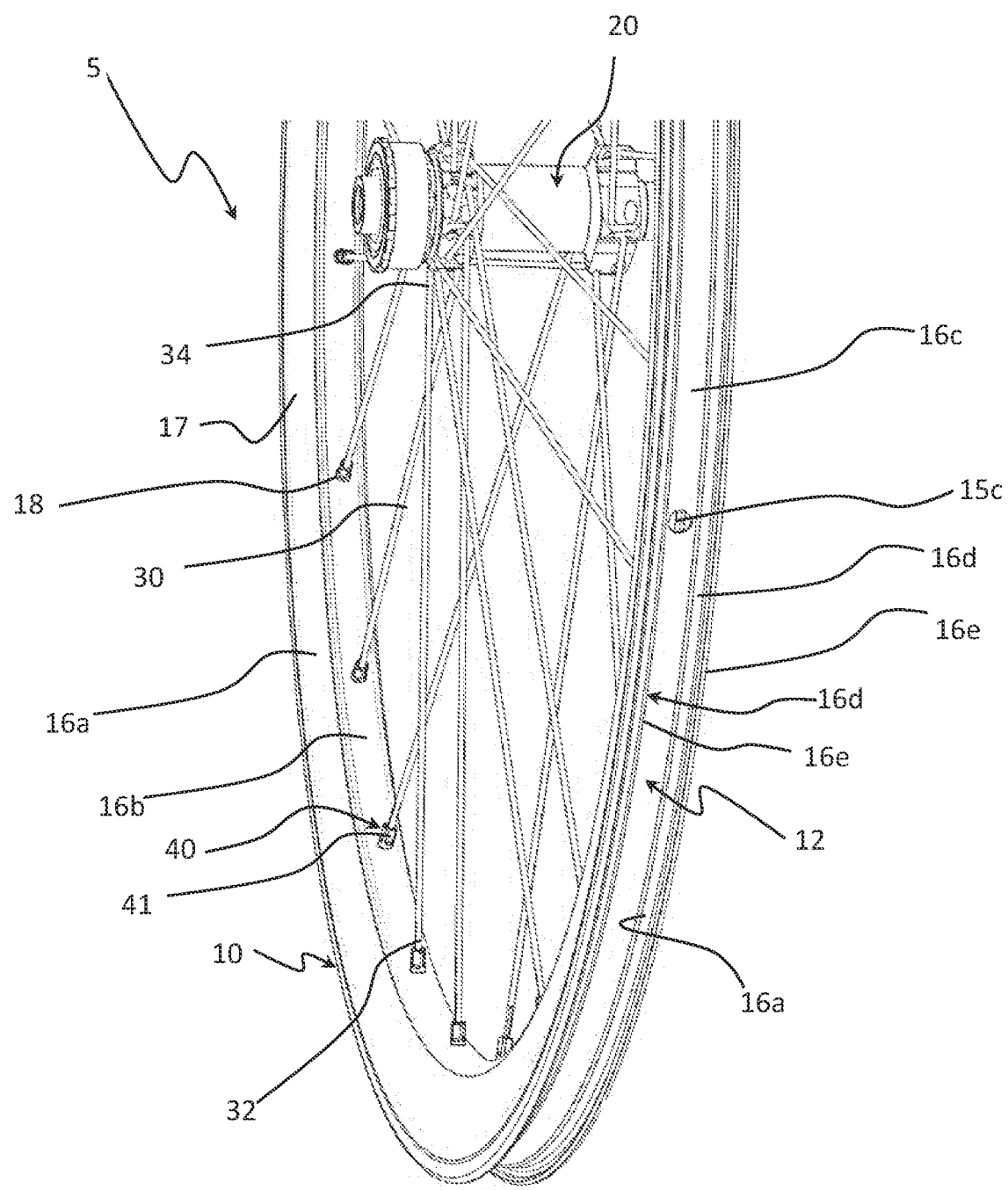
FIG. 1 is a schematic perspective view of a portion of spoked bicycle wheel according to the present invention.

With initial reference to FIG. 1, reference numeral 5 refers, as a whole, to a first embodiment of a spoked bicycle wheel according to the present invention.

The wheel 5 comprises a rim 10, a hub 20 and a plurality of spokes 30 extending between the hub 20 and the rim 10.

For the sake of clarity of illustration, reference numeral 30 is associated with only one of the spokes shown.

The rim 10 can be made of aluminium or an alloy thereof, through extrusion of a profiled bar.

Preferably, the rim 10 is, at least in part, made of a composite material. More preferably, the rim 10 is entirely made of a composite material.

The rim 10 is configured to be used with a tubeless tyre (not shown).

The rim 10 is formed by two opposite side walls 16a connected to a radially inner end by a radially inner circumferential wall or lower bridge 16b. The two side walls 16a are also connected at an intermediate point thereof by a radially outer circumferential wall or upper bridge 16c, so as to have a substantially inverted "A"-shaped cross section.

Preferably, the lower bridge 16b and the upper bridge 16c have a substantially cylindrical shape.

The side walls 16a comprise respective radially outer portions or wings 16d that form, with the upper bridge 16c, a tyre coupling channel 12. The wings 16d are provided with respective folded ends 16e that are used to hold the beads of the tyre coupled to the rim 10.

The wings 16d are subject to geometric and dimensional constraints both for the need to attach the tyre, and for the need to provide, externally, a suitable sliding surface for the possible brake pads. The upper bridge 16c is subject to the constraint, in the case of a tubeless tyre, of making an airtight seal with the tyre. In the example shown, the upper bridge 16c has a single opening 15c for the passage and the housing of an inflation valve (not shown) of the tyre or of the air chamber of the tyre.

Figure 11:
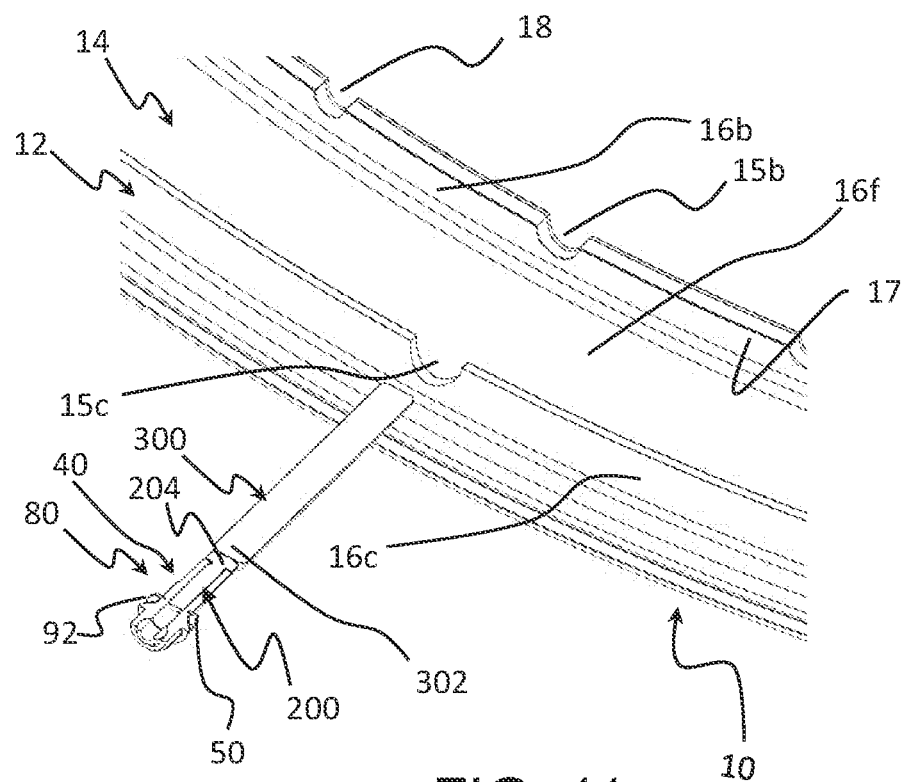
FIGS. 11-14 are perspective and partially sectioned views of successive steps of a process for manufacturing the wheel of FIG. 1.

As shown in FIG. 11, the rim 10 comprises, in a radially inner position with respect to the tyre coupling channel 12, a spoke attachment chamber 14. In particular, the spoke attachment chamber 14 is delimited by the radially inner portions 16f of the side walls 16a, by the lower bridge 16b and by the upper bridge 16c.

The radially inner portions 16f of the side walls 16a and the lower bridge 16b are not subject to particular geometric or dimensional constraints and can therefore be replaced by a single wall having an arc of circle shaped cross section or by a plurality of walls so as to form a section having a shape which is more complex than the one shown, possibly defining a plurality of annular spoke attachment chambers (not shown).

The particular shape of the rim 10 shown in FIG. 1 and in FIGS. 11-14 therefore has the purpose of merely illustrating and non-limiting the present invention.

As shown in FIG. 11, the lower bridge 16b comprises a spoke attachment surface 17 on which an opening 15b is formed. The opening 15b is substantially aligned in the radial direction with the opening 15c made on the upper bridge 16c and also provided for the passage and the housing of the inflation valve of the tyre or of the air chamber of the tyre.

In an embodiment of the rim 10, the aforementioned openings 15b, 15c are defined by respective through holes having a diameter comprised between about 6 mm and about 9 mm, for example equal to 7 mm.

As shown in FIG. 1, the spoke attachment surface 17 comprises a plurality of spoke attachment seats 18, each defined by a respective through hole. For the sake of clarity of illustration, reference numeral 18 is associated with only one of the shown spoke attachment seats.

In embodiments different from the one shown, the spoke attachment seats 18 are formed in one or both of the radially inner portions 16f of the side walls 16a of the rim 10.

The spoke attachment seats 18 are equally spaced and uniformly distributed along the middle plane of the rim 10. The number and the distribution of such spoke attachment seats 18 can however differ greatly from those of the embodiment illustrated herein. For example, the spoke attachment seats 18 could be grouped in groups of two, three or four and/or be made on plural planes, different from the middle plane of the rim 10.

Preferably, each spoke attachment seat 18 has a substantially circular section and is defined by a through hole having a diameter smaller than that of the through holes defining the openings 15b and 15c. The diameter of the through holes defining the spoke attachment seats 18 is preferably comprised between about 2.5 mm and about 7 mm, for example equal to about 5 mm.

To insert the spoke attachment assembly 80 in the spoke attachment chamber 14 it may also be contemplated not to use opening 15c, and make a dedicated opening (not shown) on the upper bridge 16c. In this way it is possible to replace a broken or damaged spoke attachment assembly 80 without having to dismount and remount the inflation valve of the tyre. Such a dedicated opening is preferably provided with a removable cover configured to close such an opening when not used.

In the rim 10 of FIG. 1, the spokes 30 are coupled to the rim 10, each at a respective spoke attachment seat 18 through a respective nipple 40. For the sake of clarity of illustration, reference numeral 40 is associated with only one of the nipples shown.

Figure 2:
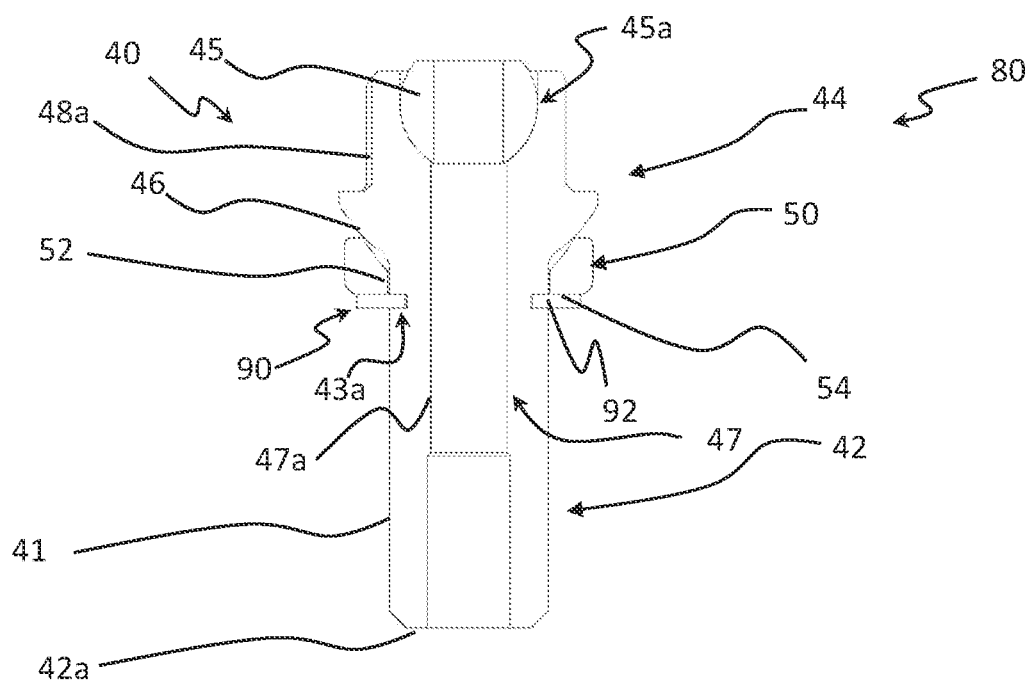
FIG. 2 is a longitudinal section of a first preferred embodiment of a spoke attachment assembly according to the present invention.

As shown in FIG. 2, the nipple 40 comprises a stem 42 configured to extend through the spoke attachment seat 18 and an enlarged head 44 (i.e. having an outer dimension greater than that of the stem 42) configured to remain inside the spoke attachment chamber 14.

A first end portion 32 of a spoke 30 is attached to the nipple 40. The second end portion 34 of the spoke 30, on the other hand, is attached to the hub 20 (FIG. 1).

The nipple 40 is preferably made of aluminium (or an alloy thereof), brass or steel.

In the embodiments illustrated herein, each nipple 40 allows the adjustment of the tension of the spoke 30 associated therewith.

The stem 42 of the nipple 40 comprises for this purpose a coupling portion 47 configured to be coupled to the spoke 30. Such a coupling portion 47 comprises a threaded hole 47a which opens at a free end 42a of the stem 42. The threaded hole has a length such as to allow the screwing to different depths of the first end portion 32 of the spoke 30. The latter has an outer threading that is threaded in a matching manner with the threaded hole 47a, so as to achieve the adjustment of the tension of the spoke 30 by rotating the nipple 40.

In the non-limiting example illustrated herein, the threaded hole 47a is a through hole and extends along the entire nipple 40, i.e. both at the stem 42 and at the enlarged head 44.

The stem 42 of the nipple 40 is configured to be inserted in the respective spoke attachment seat 18 so that a radially inner end portion 41 projects from the lower bridge 16b in the radial direction inside the rim 10, as shown in FIG. 1 in which, for the sake of simplicity of illustration, reference numerals 40 and 41 are associated with only one of the nipples shown.

As shown in FIG. 2, a shaped washer 50 is applied onto the stem 42 of each nipple 40.

Upon tensioning the spoke 30, the shaped washer 50 goes in abutment on the spoke attachment surface 17 of the lower bridge 16b of the rim 10 concentrically to the spoke attachment seat 18, inside the spoke attachment chamber 14 and in a radially outer position with respect to the lower bridge 16b, acting as a support for the enlarged head 44 of the nipple 40.

The shaped washer 50 has an outer size greater than the size of the spoke attachment seat 18 and allows a better distribution of the stresses on the lower bridge 16b of the rim 10 around the spoke attachment seat 18 upon tensioning the spoke 30.

Figure 3:
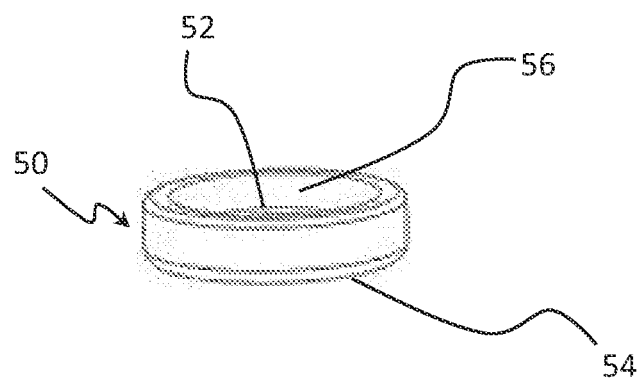
FIG. 3 is a schematic perspective view of a shaped washer forming part of the spoke attachment assembly of FIG. 2.

As shown in FIGS. 2 and 3, the shaped washer 50 has an annular shape, with a central through hole 52, a substantially flat radially inner surface 54 that is configured to abut on the spoke attachment surface 17 of the lower bridge 16b of the rim and a radially outer surface 56 configured to abut with the enlarged head 44 of the nipple 40.

In the non-limiting example shown in FIGS. 2 and 3, the radially outer surface 56 has a substantially frusto-conical or spherical shape. Correspondingly, the enlarged head 44 of the nipple 40 has a support portion 46 with a substantially frusto-conical or spherical shape.

It is possible to foresee systems aimed to avoid the unscrewing of the nipple from the spoke 30 (for example due to vibrations). For example, it is possible to use glues between the threads of the end portion 32 of the spoke 30 and the threaded hole 47a of the nipple 40. Or, at the head of the threaded end portion 32 of the spoke 30, and in particular in a radially outer position with respect to the threaded hole 47a, it is possible to arrange a perforated ball 45, for example made of nylon, arranged in a suitable seat formed in the enlarged head 44 (shown for example in FIG. 2).

Figure 4:
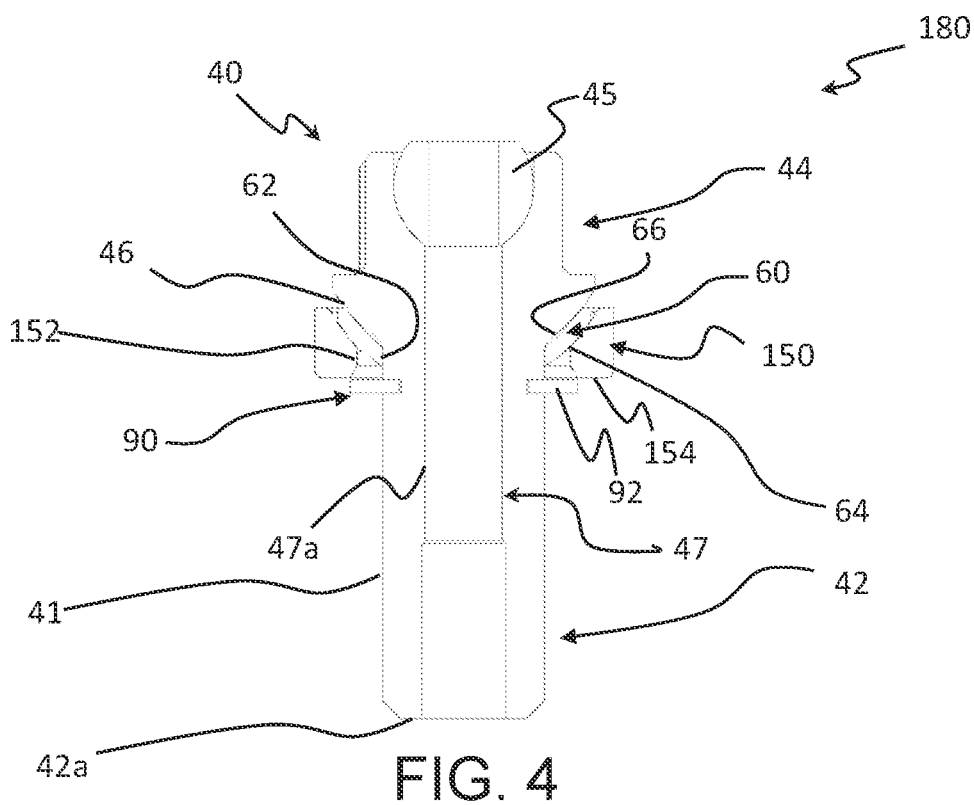
FIG. 4 is a longitudinal section of a variant of the spoke attachment assembly of FIG. 2, in which two shaped washers are provided instead of one.

In the variant of FIG. 4, the stem 42 of the nipple 40 has a further shaped washer 60 applied thereon. The further shaped washer 60 is interposed between the enlarged head 44 of the nipple 40 and the shaped washer 50.

The further shaped washer 60 has an annular shape and has a central through hole 62 configured to be arranged coaxially to the central through hole 52 of the shaped washer 50. In this way, the shaped washer 50 is at least partially arranged around the further shaped washer 60.

As shown in FIG. 4, the further shaped washer 60 has a substantially frusto-conical or spherical shape, with a radially inner frusto-conical or spherical surface 64 which is configured to abut with the radially outer surface 56 of the shaped washer 50, and a radially outer frusto-conical or spherical surface 66 which is configured to abut with the support portion 46 of the enlarged head 44 of the nipple 40.

Preferably, the shaped washer 50 and the further shaped washer 60 are made of a metallic material, for example steel.

Figure 5:
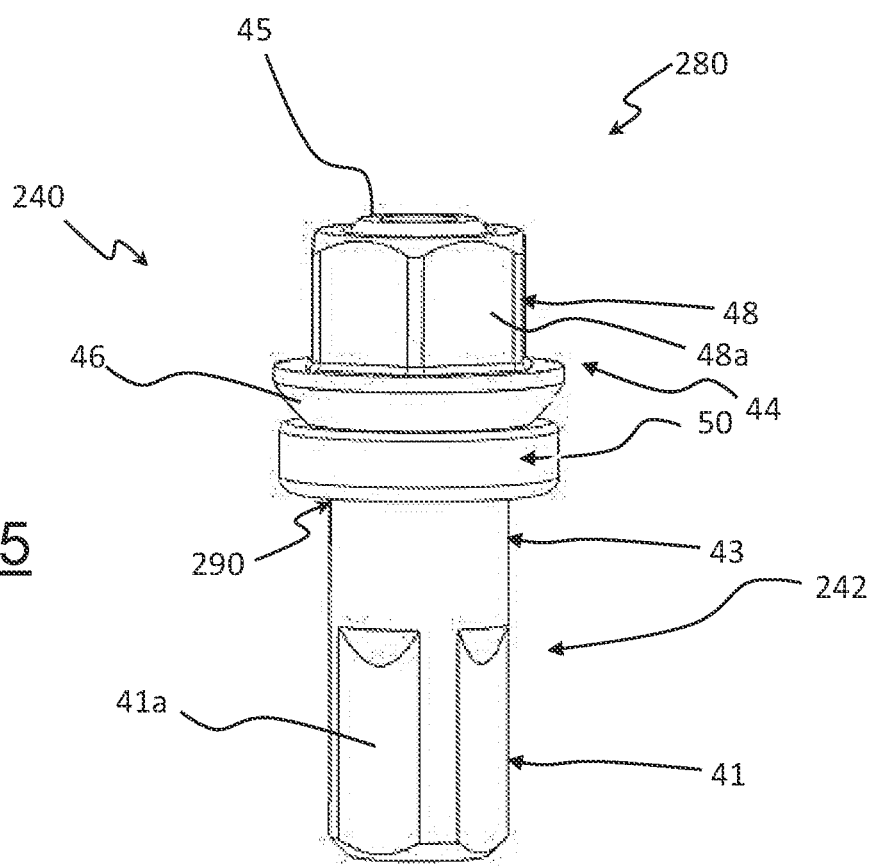
FIG. 5 is a schematic perspective view of a second preferred embodiment of a spoke attachment assembly according to the present invention.

As shown in FIG. 5, the enlarged head 44 of the nipple 40 comprises, in a radially outer position with respect to the support portion 46, a grip portion 48 having, in particular, flattened side faces 48a.

The stem 42 of the nipple 40 comprises, in a radially outer position with respect to the end portion 41, a substantially cylindrical portion 43 where the shaped washer 50 is applied, whereas the end portion 41 has longitudinal gripping splines 41a configured to be engaged by a suitable tool (not shown) in order to rotate the nipple 40 during the tensioning of the spoke 30.

The nipple 40 shown in FIGS. 1, 2, 4, 5 and 7-14 is substantially always of the same type and has the features described above.

The shaped washer 50 shown in FIGS. 2-5 and 7-14 is substantially always of the same type and has the features described above.

Figure 10:
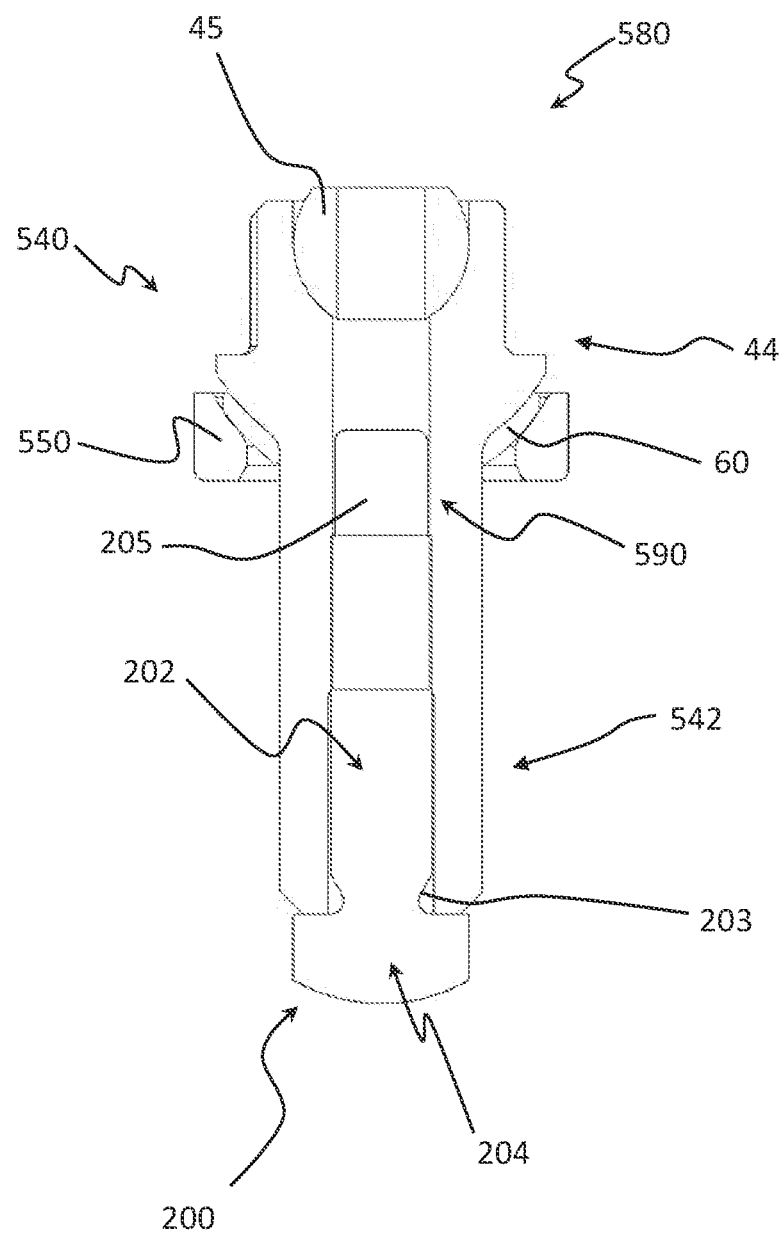
FIG. 10 is a longitudinal section of a fourth preferred embodiment of a spoke attachment assembly according to the present invention.

The further shaped washer 60 shown in FIGS. 4, 8 and 10 is substantially always of the same type and has the features described above.

FIG. 2 shows a first preferred embodiment of a spoke attachment assembly 80 configured to be coupled to the rim 10. The spoke attachment assembly 80 comprises the nipple 40, the shaped washer 50 and holding means 90 that are configured to hold the shaped washer 50 associated with the nipple 40.

The holding means 90 shown in FIG. 2 comprise a holding washer 92 housed in a groove 43a formed on an outer surface of the substantially cylindrical portion 43 of the stem 42 of the nipple 40, in a radially inner position with respect to the shaped washer 50 and thus on the opposite side to the shaped washer 50 with respect to the enlarged head 44 of the nipple 40.

The holding washer 92 has an annular and flattened shape. It has an outer size greater than the inner diameter of the shaped washer 50, so as to prevent the shaped washer 50 from slipping off from the stem 42 of the nipple 40.

Preferably, the holding washer 92 is made of a water-soluble material, to allow its removal after having positioned the stem 42 of the nipple 40 in the spoke attachment seat 18. Such a water-soluble material can for example be polyvinyl alcohol (PVOH or PVA), for example like the one commercialized in sheets by ECOMAVI of Massalombarda (Italy).

FIG. 4 shows a variant of the spoke attachment assembly 80 of FIG. 2, which differs from the one of FIG. 2 essentially in that it also comprises the further shaped washer 60.

In FIG. 4, the components and the portions of the spoke attachment assembly 180 analogous or functionally equivalent to those of the spoke attachment assembly 80 of FIG. 2 are indicated with the same reference numeral added by 100 and reference should be made to the relative description made above.

In the variant of FIG. 4, the radially inner surface 154 of the shaped washer 150 has an inner diameter greater than that of the shaped washer 50 of FIG. 2.

Also, in the variant of FIG. 4, the holding washer 92 has an outer size greater than the inner diameter of the shaped washer 150, so as to prevent the shaped washer 150, and consequently also the further shaped washer 60, from slipping off from the stem 42 of the nipple 40.

FIG. 5 shows a further variant of the spoke attachment assembly 80 of FIG. 2, which differs from the one of FIG. 2 essentially for the absence of the holding washer 92 and of the groove 43a, and for the provision of a different type of the holding means 290 used for holding the shaped washer 50 on the nipple 240.

In FIG. 5, the components and the portions of the spoke attachment assembly 280 analogous or functionally equivalent to those of the spoke attachment assembly 80 of FIG. 2 are indicated with the same reference numeral added by 200 and reference should be made to the relative description made above.

In the variant of FIG. 5, the aforementioned holding means 290 comprise an adhesive substance, such as a glue, interposed between the shaped washer 50 and the enlarged head 44 (in particular, the support portion 46) and/or the stem 242 (in particular, the substantially cylindrical portion 43) of the nipple 240.

The aforementioned adhesive substance is such as to make the shaped washer 50 adhere to the nipple 240 in a first positioning step of the spoke attachment assembly 280 at a respective spoke attachment seat 18 of the rim 10. In a subsequent step, when the spoke 30 is tensioned, the aforementioned adhesive substance must allow the relative rotation between the shaped washer 50 and the nipple 240.

Preferably, said adhesive substance is water-soluble. Such an adhesive substance can for example be a vinyl glue, which is preferably removed before tensioning the spoke.

FIG. 7 shows a further variant of the spoke attachment assembly 80 of FIG. 2, which differs from the one of FIG. 2 essentially for the absence of the holding washer 92 and of the groove 43*a*, and for the provision of a different type of the holding means 390 used for holding the shaped washer 50 on the nipple 40.

In FIG. 7, the components and the portions of the spoke attachment assembly 380 analogous or functionally equivalent to those of the spoke attachment assembly 80 of FIG. 2 are indicated with the same reference numeral added by 300 and reference should be made to the relative description made above.

In the variant of FIG. 7, the aforementioned holding means 390 comprise a flexible washer 192 applied onto an insert 200, shown in FIG. 6, which is removably associated with the nipple 40.

The insert 200 is made of a metallic material, preferably steel.

The insert 200 comprises a head 204 and a rod 202.

The rod 202 comprises an outer threading matching the inner threading of the threaded hole 47*a* of the stem 342 of the nipple 340, in order to screw the rod 202 of the insert 200 into the stem 342 of the nipple 340.

The flexible washer 192 is applied onto the rod 202 of the insert 200, for example at a circumferential groove 203 made on the rod 202 in a position adjacent to the head 204.

The flexible washer 192 can be attached to the head 204 or to the rod 202 of the insert 200 through an adhesive substance, like for example a glue.

As shown in FIG. 7, the flexible washer 192 is interposed between the free end 42*a* of the stem 342 of the nipple 340 and the head 204 of the insert 200. Preferably, the rod 202 is screwed into the stem 342 of the nipple 340 until the flexible washer 192 is brought in abutment on the free end 42*a* of the stem 342 of the nipple 340.

The head 204 has a substantially cylindrical shape, with a diameter preferably smaller than the transversal dimension of the stem 342 of the nipple 340 and smaller than the diameter of the substantially cylindrical portion 43 of the stem 342.

The flexible washer 192 has an annular and flattened shape. It has an outer dimension greater than the inner diameter of the shaped washer 50, so as to prevent the shaped washer 50 from slipping off from the stem 342 of the nipple 340.

In the non-limiting example of FIGS. 6 and 7, the flexible washer 192 has a substantially quadrangular outer profile.

Figure 9:
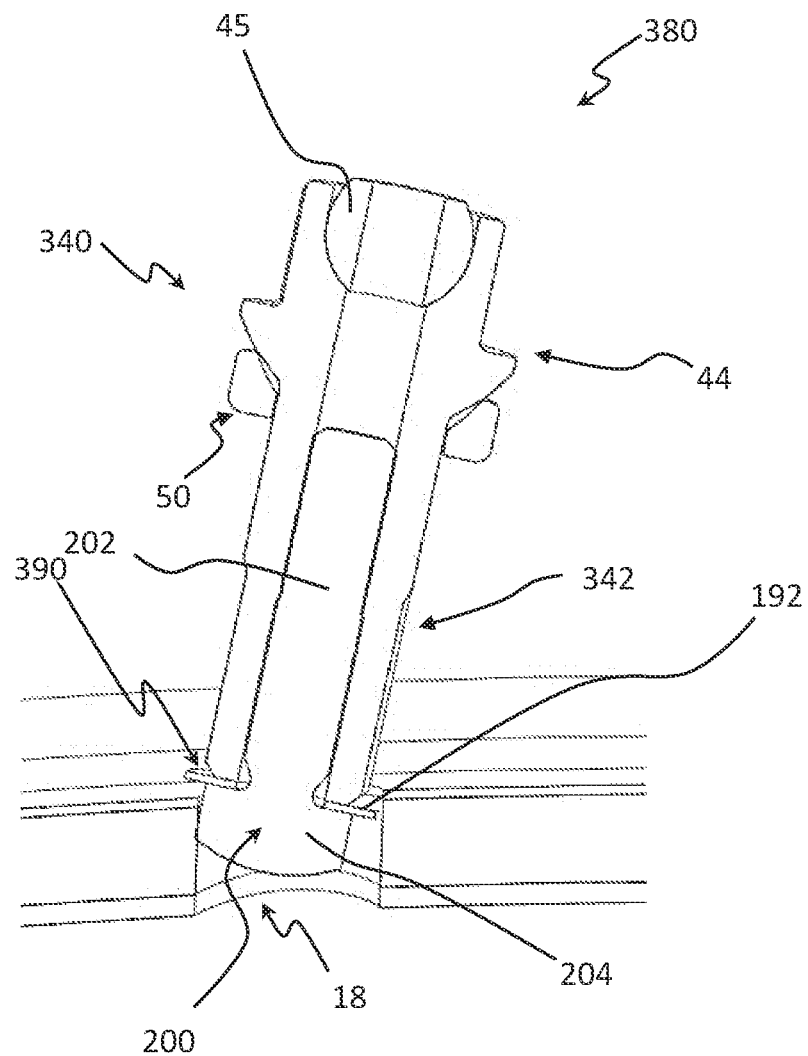
FIG. 9 is a longitudinal section of the spoke attachment assembly of FIG. 7 in a step of insertion in a spoke attachment seat of a lower bridge of the rim of the wheel of FIG. 1.

As shown in FIG. 9, while the wheel 5 is being manufactured, or during the prior assembly and/or manufacturing operations of the rim 10 aimed at manufacturing the wheel 5, the flexible washer 192 can flex to pass through the spoke attachment seat 18 during the insertion of the stem 342 of the nipple 340 in the aforementioned spoke attachment seat 18.

The flexible washer 192 is preferably made of a plastic material, for example polyester (PET), in particular Melinex®, or polyethylene terephthalate (Mylar).

FIG. 8 shows a variant of the spoke attachment assembly 80 of FIG. 7, which differs from the one of FIG. 7 essentially in that it also comprises the further shaped washer 60.

In FIG. 8, the components and the portions of the spoke attachment assembly 480 analogous or functionally equivalent to those of the spoke attachment assembly 380 of FIG. 7 are indicated with the same reference numeral added by 100 and reference should be made to the relative description made above.

In the variant of FIG. 8, the inner diameter of the radially inner surface 54 of the shaped washer 450 is greater than that of the shaped washer 50 of FIG. 7.

Also, in the variant of FIG. 8, the flexible washer 192 has an outer dimension greater than the inner diameter of the shaped washer 450, so as to prevent the shaped washer 450 and the further shaped washer 60 from slipping off from the stem 442 of the nipple 440.

FIG. 10 shows a variant of the spoke attachment assembly 80 of FIG. 8, which differs from the one of FIG. 8 essentially for the absence of the flexible washer 192 and for the provision of a different type of holding means 590 used for holding the shaped washer 550 on the nipple 540.

In FIG. 10, the components and the portions of the spoke attachment assembly 80 analogous or functionally equivalent to those of the spoke attachment assembly 480 of FIG. 8 are indicated with the same reference numeral added by 100 and reference should be made to the relative description made above.

The holding means 590 of the spoke attachment assembly 580 of FIG. 10 are defined in the rod 202 of the insert 200 and comprise, in particular, a free end portion 205 of the rod 202 which is pre-magnetized with per se known techniques (for example by friction, by contact or by induction of a magnet).

The holding in position of the shaped washer 550 and of the further shaped washer 60 on the stem 542 of the nipple 540 takes place after having screwed the insert 200 into the threaded hole 47*a* of the stem 542 of the nipple 40 (preferably until the head 204 abuts on the free end 42*a* of the stem 542), thanks to the magnetic attraction exerted on the shaped washers 550 and 60 by the magnetized free end portion 205 of the rod 202. Indeed, it is arranged close to the shaped washers 550 and 60.

Hereinafter, only for the sake of simplicity of description reference will be made to a spoke attachment assembly 80 that comprises only the shaped washer 50, but what has been stated has analogous application also to the cases in which the spoke attachment assembly 80 also comprises the shaped washer 60.

The wheel 5 is made and/or assembled easily thanks to the use of one of the spoke attachment assemblies 80 described above.

The holding means 90 are active at least until the nipple 40 is arranged at the respective spoke attachment seat 18 and are removed before or after mounting the spoke 30 in the nipple 40.

FIGS. 11-14 show the steps with which the nipple 40 and the respective shaped washer 50 are inserted in the rim 10 and positioned in a spoke attachment seat 18.

FIG. 11 shows the insertion step of the spoke attachment assembly 80 in the opening 15*c* of the upper bridge 16*c* of the rim 10 of the wheel 5.

In particular, the spoke attachment assembly 80 shown is the one of the embodiment described with reference to FIG. 2, but it could also be that of any of the variants described above.

The spoke attachment assembly 80 comprises, in addition to the nipple 40 and the shaped washer 50 held on the nipple 40 through the holding washer 92, the insert 200 described with reference to FIG. 6 (in this case without the flexible washer 192). The insert 200 is screwed into the stem 42 of the nipple 40.

A maneuvering magnet 300 is magnetically attached to the head 204 of the insert 200. In the example shown, the maneuvering magnet 300 has a substantially elongated shape, for example cylindrical, and is arranged so that an end portion 302 thereof magnetically locks to the head 204 of the insert 200. In particular, the maneuvering magnet 300 is arranged substantially aligned with the stem 42 of the nipple 40 and in contact with the head 204 of the insert 200.

The outer size of the maneuvering magnet 300 can be substantially equal to that of the stem 42 of the nipple 40 or different from it.

The maneuvering magnet 300 is inserted firstly in the opening 15c provided in the upper bridge 16c of the rim 10 and, subsequently, in the opening 15b provided in the lower bridge 16b of the rim 10, thereby pulling the spoke attachment assembly 80 inside the spoke attachment chamber 14 of the rim 10.

Figure 12:
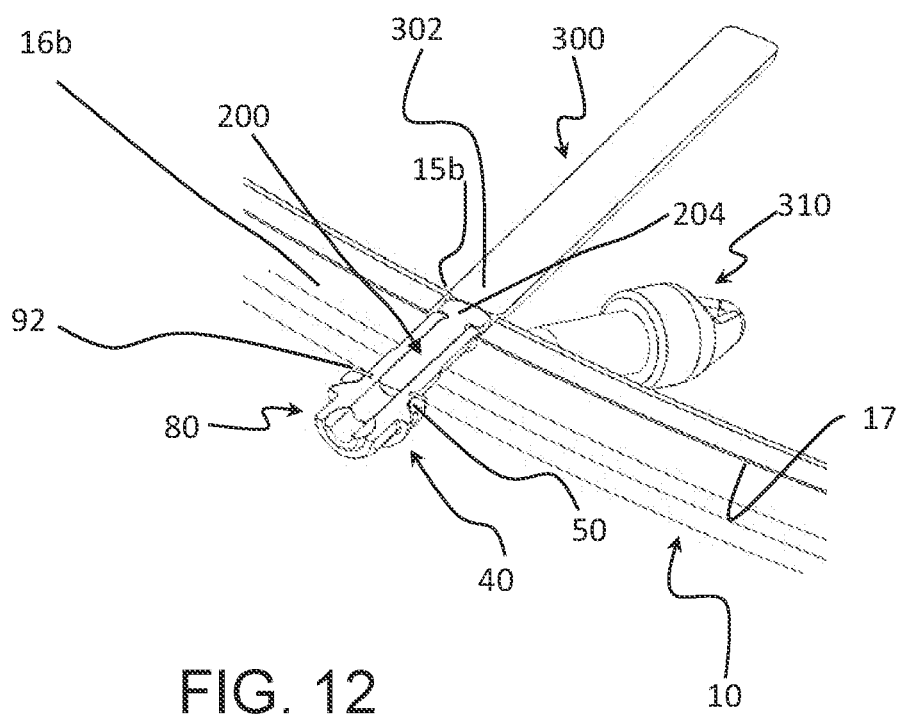

FIG. 12 shows the extraction step of the maneuvering magnet 300 from the opening 15b of the lower bridge 16b of the rim 10.

Thereafter, the maneuvering magnet 300 is decoupled from the head 204 of the insert 200.

At the same time, a guiding magnet 310 is brought towards the opening 15b. The guiding magnet 310 enters into magnetic interaction with the insert 200, in particular with the head 204 of the insert 200.

Figure 13:
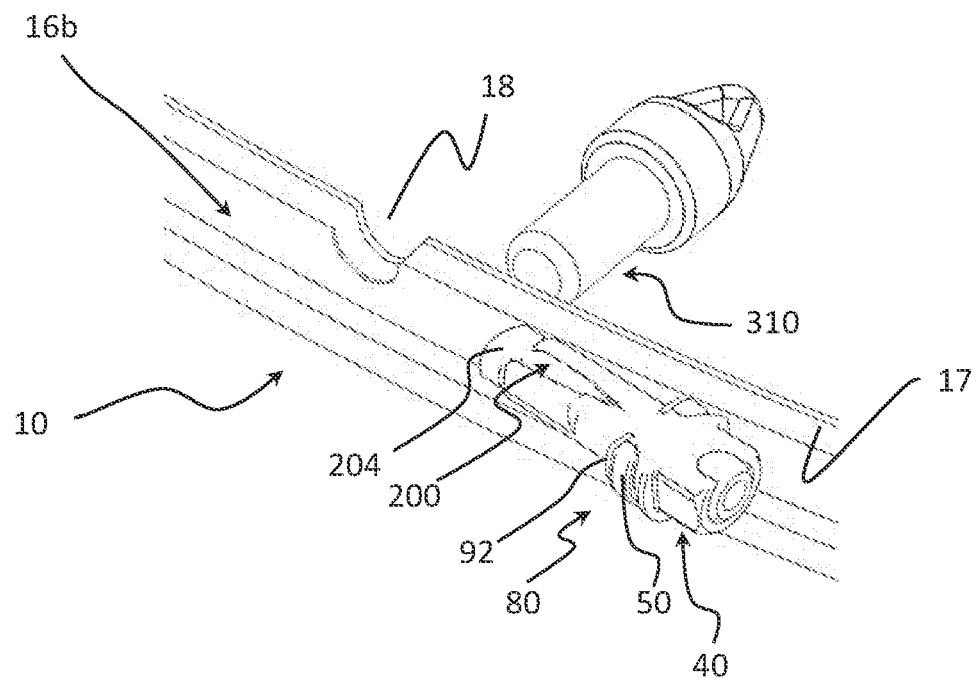

As shown in FIG. 13, the guiding magnet 310 is moved along and outside the spoke attachment surface 17 of the lower bridge 16b of the rim 10, thereby pulling the spoke attachment assembly 80 by magnetic attraction along the spoke attachment chamber 14 of the rim 10, until the spoke attachment seat 18 in which it is wished to arrange the nipple 40 and the shaped washer 50 is reached.

Figure 14:
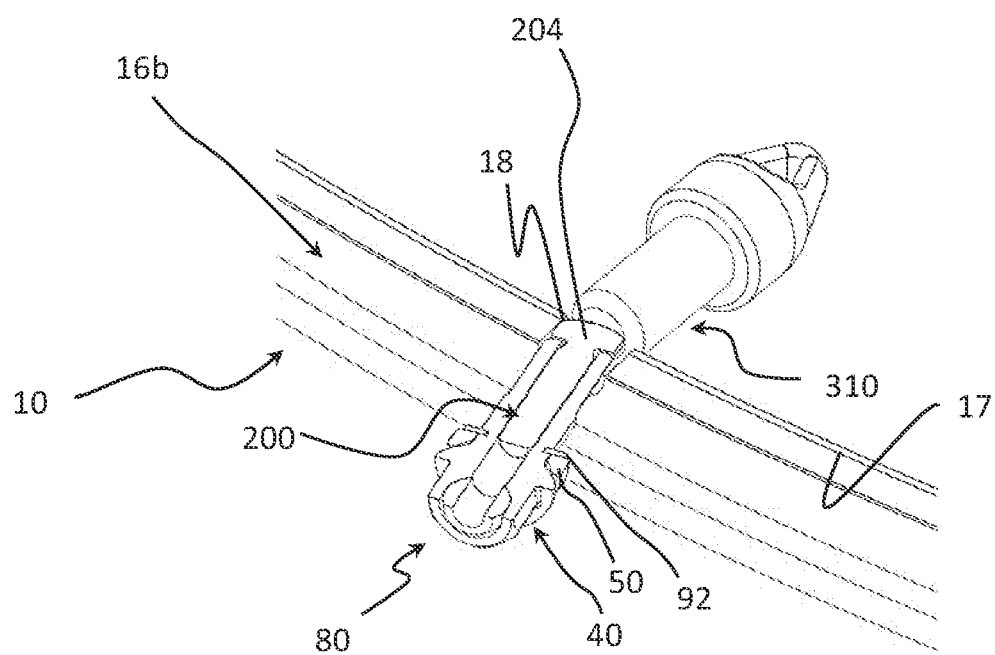

At this point, as shown in FIG. 14, the guiding magnet 310 magnetically locks to the head 204 of the insert 200. In particular, the guiding magnet 310 contacts the head 204 of the insert 200 and remains in contact therewith due to the magnetic interaction between the guiding magnet 310 and the insert 200.

Thereafter, the guiding magnet 310 is moved in the radial direction towards the inside of the rim 10 so as to insert the stem 42 of the nipple 40 in the spoke attachment seat 18 until the shaped washer 50 is brought in abutment on the spoke attachment surface 17 of the lower bridge 16b of the rim 10.

The guiding magnet 310 can thus be decoupled from the head 204 of the insert 200 and the latter can be removed from the nipple 40 to proceed with the mounting and tensioning of the spoke 30 on the nipple 40, during the manufacture of the wheel 5, or with the mounting of an anchoring element configured to hold the nipple 40 in position in the respective spoke attachment seat 18 until the moment in which, during the manufacture of the wheel 5, such an anchoring element is removed to proceed with the mounting of the spoke 30 on the nipple 40.

The mounting of the spoke 30 on the nipple 40 requires temporarily holding the nipple 40 with the fingers or a gripper tool.

Of course, those skilled in the art can bring numerous modifications and variants to the present invention as described above, in order to satisfy specific and contingent requirements, all of which are in any case within the scope of protection defined by the following claims.

In particular, it is possible to provide for any combination of the features described with reference to the different variants of the spoke attachment assembly 80 described above.

The wheel 5 of the invention can receive both tyres provided with air chamber and tubeless tyres.

The upper bridge 16c of the rim may or may not comprise further openings, as well as the opening 15c. In any case, the number of openings made on the upper bridge 16c is smaller than the number of spoke attachment seats 18 made on the spoke attachment surface 17 of the lower bridge 16b.

The maneuvering magnet 300 can have an outer dimension greater than the inner diameter of the shaped washer 50. In this case, the shaped washer 50 remains on the stem 42 of the nipple 40 even if attracted by the maneuvering magnet 300.

The head 204 of the insert 200 can have an outer dimension greater than the inner diameter of the shaped washer 50. In this case, the holding means 90 are defined by the head 204 of the insert 200.

The shaped washer 50 can be fitted onto the stem 42 of the nipple 40 with an interference coupling. In this case, the holding means 90 are defined by such interference.

The function of the aforementioned guiding magnet 310 can also be carried out by the maneuvering magnet 300 itself, so that in this variant in the manufacturing process of the wheel 5 only the maneuvering magnet 300 is used.

In order to move the spoke attachment assembly 80 along the spoke attachment chamber 14 of the rim 10 until the predetermined spoke attachment seat 18 is reached, instead of the guiding magnet 310 it is possible to use a semi-rigid cable, i.e. a cable that is sufficiently flexible to follow the shape of the spoke attachment chamber 14, yet rigid enough to be pushed along the spoke attachment chamber 14, as for example that described in Applicant's Publication US 2007/0158996 A1.

What is claimed is:

1. A spoke attachment assembly, configured to be coupled to a rim of a spoked bicycle wheel comprising:
    a nipple having an enlarged head and a stem provided with a coupling portion for coupling to a spoke;
    at least one shaped washer associated with the nipple, the at least one shaped washer comprising a substantially flat radially inner surface and a radially outer surface, the radially outer surface configured to abut the enlarged head of the nipple and the substantially flat radially inner surface configured to abut the rim; and,
    holding means configured to hold said at least one shaped washer associated with the nipple,
    wherein said spoke attachment assembly comprises a portion made of a magnetically attractable material and wherein said holding means are of a magnetic type.

2. The spoke attachment assembly according to claim 1, wherein said holding means are removable.

3. The A spoke attachment assembly, configured to be coupled to a rim of a spoked bicycle wheel comprising:
    a nipple having an enlarged head and a stem provided with a coupling portion for coupling to a spoke;
    at least one shaped washer associated with the nipple, the at least one shaped washer comprising a substantially flat radially inner surface and a radially outer surface, the radially outer surface configured to abut the enlarged head of the nipple and the substantially flat radially inner surface configured to abut the rim; and,
    holding means configured to hold said at least one shaped washer associated with the nipple,
the spoke attachment assembly comprising an insert made of a magnetically attractable material, said insert defining said holding means and being removably associated with the nipple.

4. The spoke attachment assembly according to claim 3, wherein the insert comprises a head and a rod removably housed in the stem of the nipple, wherein a free end portion of the rod is magnetized and wherein said holding means are defined by said magnetized free end portion.

5. The spoke attachment assembly according to claim 3, wherein the insert comprises a head and a rod removably housed in the stem of the nipple, said at least one shaped washer has a predetermined inner diameter and said holding means comprise a flexible washer fitted onto the rod of the insert and interposed between a free end of the stem of the nipple and the head of the insert, said flexible washer having an outer dimension greater than the inner diameter of said at least one shaped washer.

6. A spoke attachment assembly, configured to be coupled to a rim of a spoked bicycle wheel comprising:
  a nipple having an enlarged head and a stem provided with a coupling portion for coupling to a spoke;
  at least one shaped washer associated with the nipple, the at least one shaped washer comprising a substantially flat radially inner surface and a radially outer surface, the radially outer surface configured to abut the enlarged head of the nipple and the substantially flat radially inner surface configured to abut the rim; and,
  holding means configured to hold said at least one shaped washer associated with the nipple;
  wherein said at least one shaped washer has a predetermined inner diameter and said holding means comprise a holding washer mounted in a groove made on an outer surface of the stem of the nipple on the opposite side to said at least one shaped washer with respect to the enlarged head of the nipple, wherein said holding washer has an outer dimension greater than the inner diameter of said at least one shaped washer, and wherein said holding washer is made of a water-soluble material to allow its removal after having positioned the stem of the nipple in a spoke attachment seat.

7. A spoke attachment assembly, configured to be coupled to a rim of a spoked bicycle wheel comprising:
  a nipple having an enlarged head and a stem provided with a coupling portion for coupling to a spoke;
  at least one shaped washer associated with the nipple, the at least one shaped washer comprising a substantially flat radially inner surface and a radially outer surface, the radially outer surface configured to abut the enlarged head of the nipple and the substantially flat radially inner surface configured to abut the rim; and,
  holding means configured to hold said at least one shaped washer associated with the nipple;
  wherein said holding means comprise an adhesive substance interposed between said at least one shaped washer and the head and/or the stem of the nipple.

8. The spoke attachment assembly according to claim 7, wherein the adhesive substance is made of a water-soluble material to allow its removal after having positioned the stem of the nipple a the spoke attachment seat.

9. A process for manufacturing a spoked bicycle wheel, the process comprising the steps of:
  a) providing a rim element having a tyre coupling channel and at least one spoke attachment chamber, the at least one spoke attachment chamber being provided with at least one opening and with a spoke attachment surface comprising a plurality of spoke attachment seats;
  b) inserting a spoke attachment assembly into the at least one spoke attachment chamber through said at least one opening, said spoke attachment assembly comprising:
    a nipple having an enlarged head and a stem provided with a coupling portion for coupling to a respective spoke;
    at least one shaped washer;
    holding means configured to hold said at least one shaped washer associated with the nipple;
  c) moving said spoke attachment assembly along said spoke attachment surface and up to one of said spoke attachment seats;
  d) inserting the stem of the nipple of said spoke attachment assembly in said spoke attachment seat;
  e) constraining said spoke attachment assembly to said spoke attachment seat;
  f) repeating steps b) to e) and coupling a respective spoke attachment assembly to each other spoke attachment seat.

10. The process according to claim 9, wherein said spoke attachment assembly further comprises a portion made of a magnetically attractable material and wherein step b) of inserting said spoke attachment assembly into the at least one spoke attachment chamber comprises the following steps:
  coupling a maneuvering magnet to said spoke attachment assembly due to a magnetic coupling between the maneuvering magnet and the portion made of a magnetically attractable material;
  inserting the maneuvering magnet in said at least one spoke attachment chamber through said at least one opening;
  extracting the maneuvering magnet from said at least one spoke attachment chamber through a second opening substantially aligned with said at least one opening;
  decoupling the maneuvering magnet from said spoke attachment assembly.

11. The process according to claim 10, wherein said portion made of a magnetically attractable material is defined by an insert made of a magnetically attractable material which is removably coupled to the nipple.

12. The process according to claim 10, wherein step c) of moving said spoke attachment assembly takes place due to a magnetic interaction between said portion made of a magnetically attractable material and a guiding magnet and comprises moving said guiding magnet along the spoke attachment surface towards and up to one of said spoke attachment seats and,
  wherein step d) of inserting the stem of the nipple in said spoke attachment seat takes place due to a magnetic coupling between said guiding magnet and said portion made of a magnetically attractable material.

13. The process according to claim 9, comprising, during or after step e) of constraining said spoke attachment assembly to said spoke attachment seat, the step of coupling an end portion of a spoke to the coupling portion of the stem of the nipple inserted in said spoke attachment seat.

14. The process according to claim 13, comprising, after step e) of constraining said spoke attachment assembly to said spoke attachment seat and before or after the step of coupling an end portion of a spoke to the coupling portion of the stem of the nipple, removing the holding means.

* * * * *